Dec. 9, 1941.                  W. C. BARNES ET AL                    2,265,136
                            FLAW DETECTING APPARATUS
                              Filed June 4, 1938                2 Sheets-Sheet 1
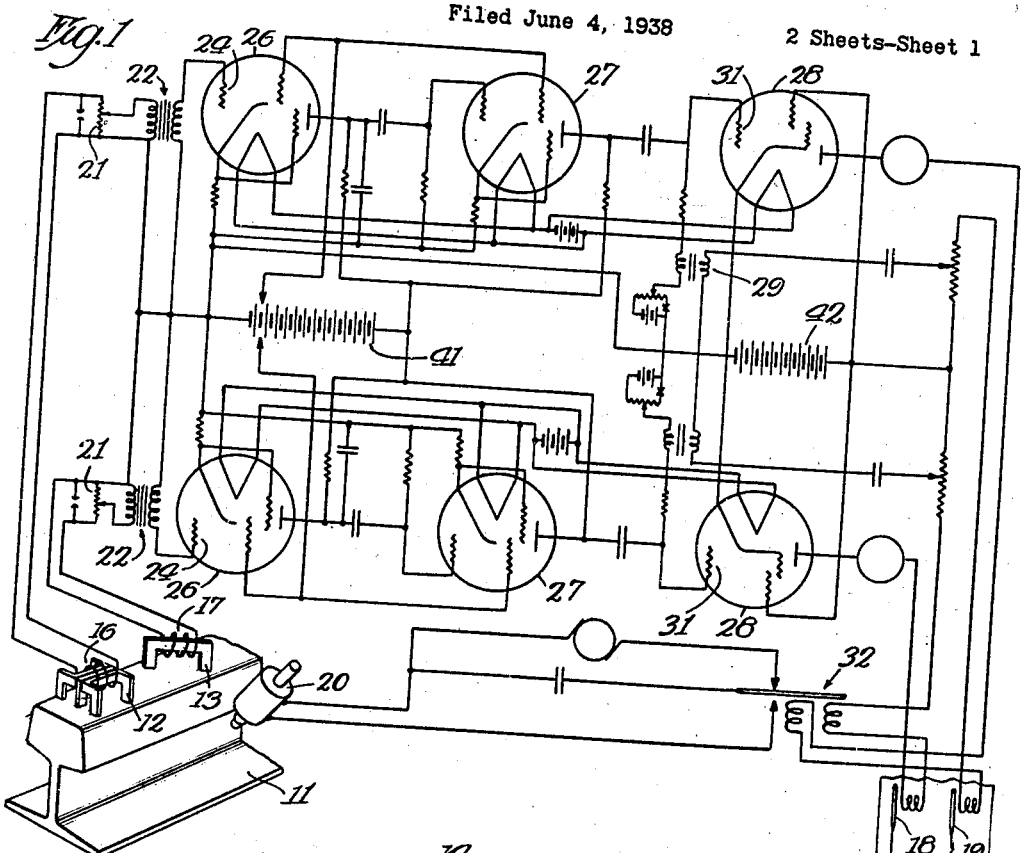
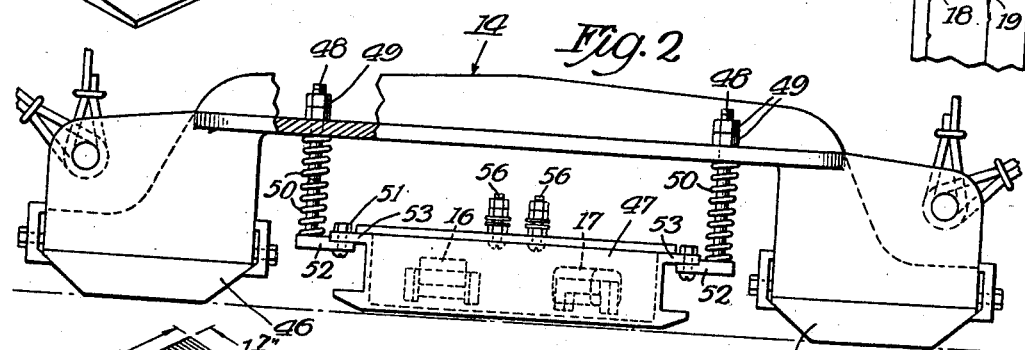
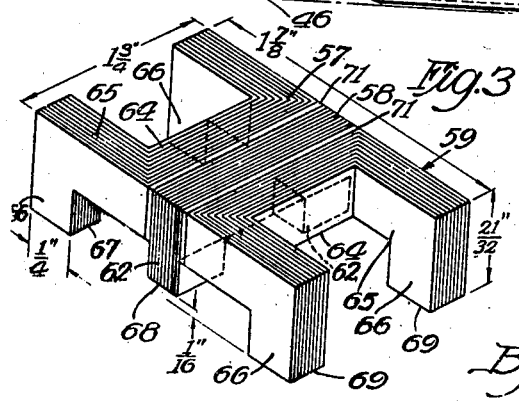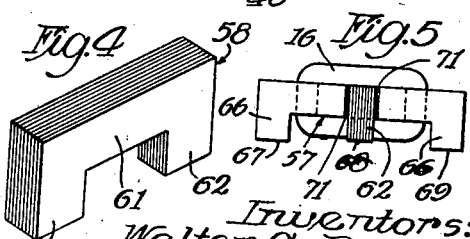
Inventors:
Walter C. Barnes
Henry W. Keevil
By Mason, Brown & Co.
Attys.

Dec. 9, 1941.                    W. C. BARNES ET AL                    2,265,136
                                FLAW DETECTING APPARATUS
                                  Filed June 4, 1938                2 Sheets-Sheet 2
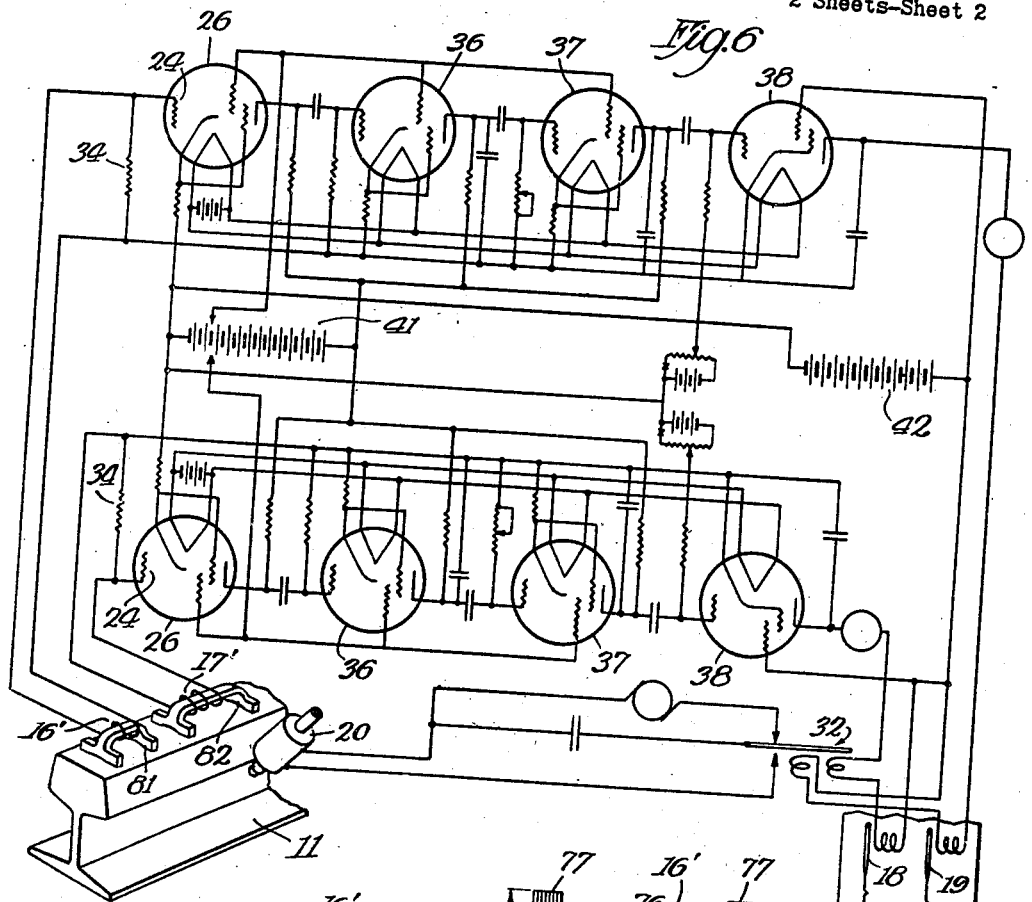
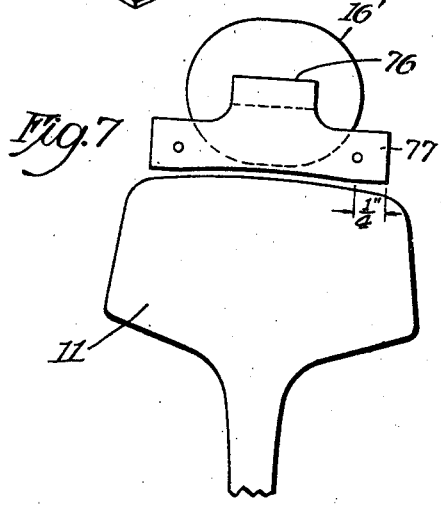
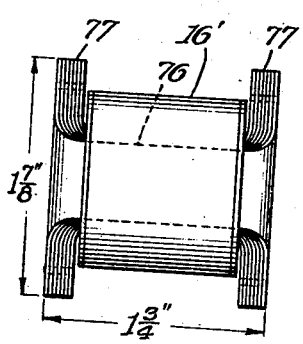
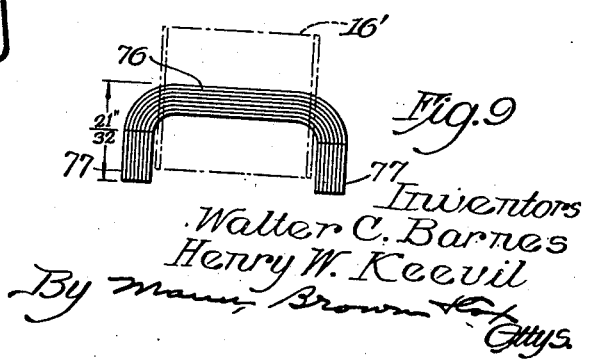
Inventors
Walter C. Barnes
Henry W. Keevil
By Mann, Brown
       Attys.

Patented Dec. 9, 1941

2,265,136

UNITED STATES PATENT OFFICE 2,265,136

FLAW DETECTING APPARATUS

Walter C. Barnes, Lake Bluff, and Henry W. Keevil, Highland Park, Ill.

Application June 4, 1938, Serial No. 211,786

6 Claims. (Cl. 175—183)

In testing rails for flaws by the residual magnetism method it has been found that special coil units and special arrangements of the coils and the iron cores thereof produce satisfactory results, whereas ordinary coil units have been erratic and unreliable.

When a rail is tested by the residual magnetism method, it is first magnetized as by a suitable electromagnet carried near the front end of the detector car. Near the rear of the car, or on a second car, a detector unit is carried adjacent the rail to detect magnetic fields adjacent the rails caused by flaws therein, being at a sufficient distance from the electromagnet so that it is affected only by the residual magnetism of the rail which forms an external field adjacent a flaw. One of the advantages of testing by the residual magnetism method is that substantially no flux is picked up by the detector unit except in the vicinity of a flaw and therefore uniform spacing of the detector unit from the rail is not vital, although it is desirable from the standpoint of determining the seriousness of flaws. In such detector units there is included a coil wound on a core structure which has its ends extending fairly close to the rail so as to carry through the coil such flux as it may pick up from the rail in the vicinity of flaws therein. The coil is of course connected to suitable amplifying apparatus which in turn operates recording and indicating instruments.

Such flaws are widely varied in nature and in their positions in the rails. With some of them the magnetic phenomena outside the rail are very weak in nature, and the detector units must therefore be highly responsive. Experiments have shown that with all detecting methods some detector or pick-up units are much more responsive than others in detecting some types of flaws.

An object of the present invention is to provide detector coil units or combinations of such units which will be highly reliable in their ability to detect various types of flaws in various locations in the rail head. According to preferred forms of the invention the coil unit is so constructed as to be responsive to magnetic characteristics across the entire width of the rail head. Such forms of coil units are advantageous in either picking up magnetic flux which is much stronger in one lateral position of the rail than elsewhere or in picking up the maximum amount of flux when the flux is distributed more or less evenly across the rail head. When a combination of coil units is used, the second unit is preferably sufficiently different from the first unit in one or more of various particulars so as to be more highly responsive to those types of flaws as to which the first unit is less responsive.

Additional objects and advantages of the invention will be apparent from the following description and from the drawings, in which:

Fig. 1 is a diagrammatic view showing one combination of detector coil units, each connected through a transformer to a regenerative amplifying system for operating the recording device and the paint gun which automatically indicates the position on the rail at which a flaw is found.

Fig. 2 is a side elevation partly broken away of a detector carriage with the pick-up box carried therebelow.

Fig. 3 is a perspective view of one preferred form of core structure.

Fig. 4 is a perspective view of the central portion of the core structure in Fig. 3 which may serve as a separate core structure.

Fig. 5 is an end view of a coil unit including the core structure of Fig. 3.

Fig. 6 is a view corresponding to Fig. 1 but showing a different combination of coil units, each connected to an amplifying system which in turn operates the recording apparatus and the paint gun.

Fig. 7 is an end view of a coil unit including either of the cores shown in perspective in Fig. 6 and diagrammatically showing its relationship to the rail.

Figs. 8 and 9 are top and side views respectively of the coil unit shown in Fig. 7.

Preferred embodiments of the invention have been shown in the drawings and will hereinafter be described all as required by sec. 4888 of the Revised Statutes, but the appended claims are not to be limited by the specific disclosure except as may be required by the prior art.

One form of the general flaw-detecting system is diagrammatically illustrated in Fig. 1. The rail being tested is represented by the fragmentary rail portion 11. It will be understood that prior to the operation of the detecting system shown in this figure the rail will have been magnetized. The usual procedure is for a car to run along the track comprising the rails to be tested and carry near its forward end an electromagnetic magnetizing unit, which magnetizes the rail. The detector system shown in Fig. 1 includes one or more detector coil units 12 and 13 which are positioned adjacent to the rail near the rear end of the car so as to be influenced by the residual magnetism emanating from a rail in the vicinity of a flaw but not by the magnetic field of the electromagnet. The detector coil units are carried by a suitable detector carriage 14 shown in Fig. 2. The coil units include suitable core structures which comprise a major portion of this invention and each has wound thereon a detector coil, these coils being numbered 16 and 17 for the respective coil units 12 and 13. Each of the coils 16 and 17 is connected to an amplifying system for operating either the stylus 18 or the stylus 19 respectively and for operating the paint gun 20 whenever a flaw-indicating magnetic field is picked up by the coil units 12 or 13. The two amplifying systems for the units 12 and 13 will be largely independent, although they may have common batteries. Therefore, the amplifying system need be described only with respect to one of the units.

The coil 16 is connected across a potentiometer 21 to the primary coil of a transformer 22. The secondary coil of the transformer is connected to a control grid 24 of the first amplifying tube 26. The impulse induced in coil 16 is thus amplified by the tube 26. It is also amplified in turn by tubes 27 and 28. The latter tube is connected in a regenerative circuit with its output fed back through a transformer 29 to its control grid 31. The combination of the potentiometer 21, the transformer coupling 22 and the regenerative unit represented by the tube 28 provides a very selective and effective amplifying system. The transformer 22 tends to dampen out certain types of impulses, particularly the lower intensity or more greatly tapered off impulses which may be due to waviness of the rails. At the same time the regenerator tube 28 makes the amplifying system so sensitive that very weak impulses which are transmitted by the transformer 22 to the control grid 24 will be sufficiently amplified to actuate the stylus 19 and the relay 32 for paint gun 20. Thus, if the potentiometer 21 is set properly for given conditions, the weaker impulses due to rail waviness and the like will be completely ineffective while the stronger or at least different impulses resulting from flaws will effectively operate the detector system.

In Fig. 6 a different type of amplifying system has been illustrated which is preferable under some conditions. The coil 16 is in this instance connected directly to the control grid 24 of the first tube and across a resistance 34 which may be variable if desired. Instead of using one intermediate tube 27 and a regenerative output tube 28, two intermediate tubes 36 and 37 are used with an output tube 38 which is not connected in a regenerative circuit. The regenerative amplifying unit with its extreme sensitivity is preferred when an input transformer 22 is used, which tends to dampen out the undesired impulses. With the direct input coupling of Fig. 6, however, the non-regenerative system there illustrated is preferred.

It may be noted that both of the systems use two separate B batteries 41 and 42. The B battery 42 in each instance is used only for the output tubes 28 or 38 so that the large variations of current flowing through this battery which may produce voltage drops will not affect the preliminary portions of the circuit. The current variations through the battery 42 are exceptionally high because of the fact that the output tube in each instance is normally biased approximately to the cutoff point so that the current varies approximately from zero to the maximum output of the output tube.

Although in Fig. 1 two regenerative amplifying units have been shown and in Fig. 6 both units are non-regenerative, it should of course be understood that, if desired, one of the units could be the amplifying system shown in Fig. 6 while the other was that shown in Fig. 1 with the regenerative tube 28, the transformer 22 and the potentiometer 21.

Although any suitable form of detector carriage may be used, that shown in Fig. 2 has been found very satisfactory. Such carriage is controlled from within the car to raise it from the rail or to lower it onto the rail. It is provided with shoes 46 which slide along the top of the rail and usually with shoes, not shown, which slide along the inside of the rail to position the carriage properly with respect to the rail. A pick-up box 47 is carried by the carriage in a manner to be very accurately positioned with respect to the rail. In the illustrated form it is suspended by four suspension rods 48, one near each corner of the box 47 which are limited in their downward movement by nuts 49 and are yieldingly urged downwardly to the limit of their movement by springs 50. The adjustment of all four of the suspension rods will raise or lower the box 47 to position it at the desired distance above the rail. By adjusting only two of the suspension rods as those on the inside of the rail, the inclination of the box 47 may be adjusted as desired. The lateral position of the pick-up box 47 with respect to the rail may be adjusted by loosening screws 51 which extend through slots either in the brackets 52 carried by the suspension rods 48 or in the flanges 53 of the pick-up box 47.

The pick-up box 47 is preferably provided with suitable terminal posts 56 for making the necessary connections with the coils 16 and 17 therein.

*Multi-core structures*

One of the preferred forms of core structures has been shown in Figs. 3 to 5. This form may conveniently be called a multi-core structure because of the fact that it in reality comprises three cores 57, 58 and 59 within one coil. The core 58 is seen separately in Fig. 4 and considered alone is similar to conventional core structures.

It includes a longitudinal portion 61 which could be called the core when using this word in its narrower sense, meaning that portion of the core structure which is within the coil. In addition, it includes two extensions or feet 62 which simply extend downwardly from the longitudinal portion 61 toward the rail.

The core structures 57 and 59 are identical except for being reversed as to position. Each includes a longitudinal portion 64, a transversely extending portion 65 and the downward extension or foot 66 which extends toward the rail.

A single coil 16 extends around all of the longitudinal portions 61 and 64 as seen diagrammatically in Fig. 1. With this arrangement a current will be induced in the coil 16 whenever there is a surge of magnetism therethrough whether this magnetism be in the core 57, the core 58 or the core 59. The core 57 terminates in faces 67 which are adjacent one side of the top of the rail head, the core 58 terminates in faces 68 which are adjacent the center of the top of the rail head, and the core 59 terminates in faces 69 which are adjacent the other side of the top of the rail head. The result is that if a flaw is so positioned and of such nature as to produce an external magnetic field only near the one side of the rail, the core 57 will pick up such magnetic field and induce a voltage in the coil 16. If the flaw produces an external field only near the center of the rail, the core 58 will pick up such field and induce the voltage in the coil 16. Likewise, if the flaw produces the magnetic field only near the other side of the rail the core 59 will be effective to induce the voltage in the coil 16. Whichever core induces the voltage in the coil 16, this voltage will be amplified by the amplifying unit and will cause a current to flow through the output circuit to operate the stylus 19 and the paint gun 20. In the event of a flaw which produces a magnetic field all across the rail, all three of the cores will pick up this field and a relatively high voltage will be induced in the coil 16.

The intensity of the voltage which a given magnetic field would produce in the coil 16 operating through each of the cores 57, 58 and 59 may be controlled by the distance of the faces of the various cores from the rail. At the present time it is preferred that the faces 68 of the central core 58 be one-sixteenth inch higher than a horizontal plane passing through the faces 67 and 69 of the outside cores 57 and 59. This approximately corresponds to the common curvature of the top of the rail head seen in Fig. 7.

Each of the cores 57, 58 and 59 is preferably formed by a stack of laminations, as clearly seen in Figs. 3 to 5. These laminations will of course be made of the usual laminated core stock such as is used in transformers and which may be classified as a silicon steel. One coil which has been found satisfactory is a coil comprising 7500 turns of No. 36 enameled wire, although of course both the number of turns and the size of wire may be widely varied.

This multi-core coil unit will be used only with the longitudinal portions extending generally in a longitudinal direction of the rail, since its cores would be mere duplicates of one another in effect if they extended mainly transversely of the rail. Because of being longitudinally disposed, the coil unit 12 will pick up primarily flux extending longitudinally of the rail, or, in other words, will be responsive primarily to longitudinal fields adjacent the rail. There may be some types of flaws, however, which will produce fields which are both longitudinal and transverse, and in that case it is possible that the flux to which the unit 12 is exposed might at a given instant so polarize the cores that one face 69 would be a north pole whereas the adjacent face 68 and the other face 69 would both be south poles. With this situation the flux entering the north pole face 69 would tend to pass through the adjacent south pole face 68 more than through the other south pole face 69. That would of course be undesirable inasmuch as it would have little or no effect on the coil 16. In short, the pole face 68 and likewise the pole face 67 might act as shunts for shunting flux from the face 69 away from the coil 16 instead of letting this flux pass through the coil 16. To prevent such undesirable shunting effect it is preferred to separate the cores 57, 58 and 59 by non-magnetic spacers 71 of sufficient width so that when there is a difference of magnetic potential between the two pole faces 69 the corresponding magnetic flux will pass through the core 59 rather than through the adjacent spacer 71 and into the other cores. The laminations of the cores help in a similar way since a laminated core has much more reluctance in a direction perpendicular to its laminations than longitudinally thereof. It is apparent therefore that the unit 12 will be responsive to any magnetic fields which have any substantial longitudinal component.

Wide-pole cores

In Figs. 7 to 9 another type of core structure has been shown which has somewhat different characteristics from the core structures of Figs. 3 to 5, although being similar in many respects. In this instance the core structure comprises a single core having a longitudinal portion 76 and laterally extending pole portions 77. Each pole portion 77 is preferably nearly the full width of the top of the rail head and is shaped to approximately correspond to the normal shape of such rail heads. Thus, the bottom face of the pole portion 77 may be curved substantially as shown in Fig. 7 with its center approximately one-sixteenth of an inch higher than its ends. This curve is preferably carried to at least within a quarter of an inch of the ends. This form of core structure is extremely advantageous in gathering in the maximum amount of flux from the entire width of the top of the rail head. It should be understood that the total flux above a rail which is only residually magnetized is very low and that therefore the single longitudinal core 76 is able to carry the entire flux gathered by the extended pole portions 77 without approaching a disadvantageous portion of the permeability curve, in other words, without approaching the knee of the curve which is sometimes spoken of as the saturation point. This form of core also serves exceedingly well to detect longitudinal magnetic fields which are somewhat localized along a given side of the rail or along the center of the rail. Although it does not have the non-magnetic spacers 71 with their advantages, it has the alternative advantage of a smaller longitudinal core so that the coil may have shorter turns. This not only brings the wire in the coil closer to the center of the core but also reduces the total length of wire in the coil for a given number of turns and consequently reduces its resistance. The core preferably comprises a stack of laminations as seen clearly in Figs. 8 and 9.

Combinations of detector coil units

Probably all detector coil units are more responsive to magnetic fields which are disposed in one direction with relation to the coil unit than equal fields disposed in another direction. This differential responsiveness is very marked in some coil units. For example, the coil unit 12, using the core shown in Figs. 3 to 5, is designed primarily to respond to magnetic fields which are longitudinal of the rail. When such a differentially responsive detector coil unit is used, it is desirable to use in combination with it another detector coil unit which is highly responsive to those types of magnetic fields which have relatively little effect on the first detector coil unit. This is equally true whether the differential responsiveness be due to differences in direction, differences in spacing or other differences in the magnetic characteristics of the coil units.

In Fig. 1 a combination of detector coil units has been shown which is very satisfactory. The first unit 12 is highly responsive to magnetic fields longitudinally of the rail no matter what portion of the rail these fields appear on most strongly. Detector coil unit 13, on the other hand, because of the generally transverse position of its core is highly responsive to transverse magnetic fields. Thus, if there are any magnetic fields which are so nearly transverse in disposition that they have insufficient reaction on unit 12, they will have maximum reaction on unit 13. Because the rail is longitudinally magnetized it is probable that none of the residual fields are quite perpendicular to the rail. Accordingly, the unit 13 has been illustrated in a slightly diagonal position rather than truly perpendicular to the rail. Of course, the transverse responsive unit 13 could also be used very satisfactorily with the unit shown in Figs. 7 to 9.

Another combination of units has been illustrated in Fig. 6, in which the coil unit 81 including coil 16' is relatively short, and the unit 82 including coil 17' is relatively long. With this combination of coil units the unit 81 will respond most effectively to short, concentrated magnetic fields, while the unit 82 might respond better to the longer magnetic fields.

Fig. 1 has illustrated the combination of two coil units which are different in type, one being multi-cored and the other having but a single core, and which are different in angle of disposition, one being longitudinal and the other being mainly transverse. Fig. 6 shows a combination of coil units which are different in length. In addition to these differences the coil units may have other differences, such as differences in the coils, differences in height from the rails, and differences in lateral positioning with respect to the rails. Likewise, as previously mentioned, they may be connected to different types of amplifying systems.

Furthermore, other types of coil unit combinations may prove advantageous, such as those having two coil units connected together in series-opposition and connected to a single ampliplying unit. Experiments so far have indicated that such series-opposition coil units should have the cores positioned end to end, possibly so that the long fields, such as might be due to corrugations or gradually reduced cross sections of the rail can pass through both coils and balance out while the shorter flaw-indicating fields will pass through the coils one at a time.

Because unpredictable results sometimes follow from apparently unimportant changes in the coil units, dimensions are shown in the drawings which have been found satisfactory although it is probable that the dimensions can be widely varied and some of them disregarded.

From the foregoing it is seen that various forms of flaw-detecting apparatus have been provided which include detector coil units or combinations of such units that are thoroughly reliable in responding to the magnetism emanating from a residually magnetized rail in the vicinity of hidden flaws therein and which, furthermore, may be varied to adapt them to varying conditions.

We claim:

1. In a detector for polarized rail flaws, a flux responsive device comprising a core made of horizontally disposed laminations turned downwardly at their ends towards the top of the rail, and end portions on the laminations having a spread approximately the width of the rail head and an intermediate portion proximate the rail and terminating at a point from the rail a distance approximately equal to the distance that the outer edges of the end portions are disposed from the rail.

2. In a detector for polarized flaws in a test piece, a flux responsive device comprising a core made of horizontally disposed laminations turned downwardly at their ends to terminate approximately in the same plane at certain points over their width and to follow a predetermined contour over the remaining portion of their width, a coil around the horizontally disposed laminations and responsive to flux variations in the test piece.

3. A detector system including a pair of coils, amplifying and registering apparatus associated with each coil, and cores for the coils arranged in tandem, both of said cores having pole portions at opposite sides of the core adjacent the rail and spaced longitudinally thereon, the longitudinal spacing of the pole portions of the core of one coil being substantially greater than the longitudinal spacing of the pole portions of the core of the other coil whereby the registering means will distinguish between flux variations concentrated longitudinally and flux variations which are not so concentrated.

4. In a flaw detecting apparatus adapted to have relative movement with respect to a test body that has been energized to produce special magnetic conditions in the vicinity of flaws, the combination of a pair of magnetically responsive detecting units each including a core forming a part of a magnetic circuit in which the path of least reluctance intersects the test body at spaced points, these points for each core being spaced generally longitudinally of the direction of relative movement, these points for one core being spaced apart a substantially greater longitudinal distance than the corresponding points for the other core, and means associated with said cores and responsive thereto for producing visual indications that distinguish the flow of flux through one core from that flowing through the other core, whereby different types of variations in the test body will produce different relationships between the registrations of the flux passing through the two cores.

5. In a flaw detecting apparatus adapted to have relative movement with respect to a test body that has been energized to produce special magnetic conditions in the vicinity of flaws, the combination of a pair of magnetically responsive detecting units each including a core forming a part of a magnetic circuit in which the path of least reluctance intersects the test body at spaced points, these points for one core lying in a line generally parallel to a line joining these points for the other core and these points for one core being spaced apart a substantially greater distance than the corresponding points for the other core, and means associated with said cores and responsive thereto for producing visual indications that distinguish the flow of flux through one core from that flowing through the other core, whereby different types of variations in the test body will produce different relationships between the registrations of the flux passing through the two cores.

6. In flaw detecting apparatus adapted to have relative movement with respect to a test body that has been energized to produce special magnetic conditions in the vicinity of flaws, the combination of a pair of magnetically responsive detecting units each including a core forming a part of a magnetic circuit in which the path of least reluctance intersects the test body at spaced points, these points for one core being spaced apart a substantially greater distance than the corresponding points for the other core, and means associated with said cores and responsive thereto for producing visual indications that distinguish the flow of flux through one core from that flowing through the other core, whereby different types of variations in the test body will produce different relationships between the registrations of the flux passing through the two cores.

WALTER C. BARNES.
HENRY W. KEEVIL.